US008318331B2

(12) United States Patent
Sakurai et al.

(10) Patent No.: US 8,318,331 B2
(45) Date of Patent: Nov. 27, 2012

(54) MAGNETIC RECORDING MEDIUM, METHOD FOR MANUFACTURING THE SAME, AND MAGNETIC RECORDING APPARATUS

(75) Inventors: Masatoshi Sakurai, Tokyo (JP); Yoshiyuki Kamata, Tokyo (JP); Satoshi Shirotori, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 928 days.

(21) Appl. No.: 11/942,904

(22) Filed: Nov. 20, 2007

(65) Prior Publication Data

US 2008/0117544 A1 May 22, 2008

(30) Foreign Application Priority Data

Nov. 21, 2006 (JP) ................................ 2006-314195
Nov. 15, 2007 (JP) ................................ 2007-296865

(51) Int. Cl.
*G11B 5/127* (2006.01)
*G11B 5/82* (2006.01)
*G09B 5/228* (2006.01)
*G09B 5/293* (2006.01)
*G09B 5/306* (2006.01)

(52) U.S. Cl. ......... 428/836; 428/826; 360/110; 360/135

(58) Field of Classification Search .................. 428/826, 428/836; 360/110, 135
See application file for complete search history.

(56) References Cited

U.S. PATENT DOCUMENTS

| | | | | |
|---|---|---|---|---|
| 5,461,600 A | * | 10/1995 | Pohl | ............................ 369/44.38 |
| 6,055,139 A | | 4/2000 | Ohtsuka et al. | |
| 6,139,936 A | * | 10/2000 | Weiss | ............................ 428/141 |
| 6,324,032 B1 | | 11/2001 | Ohtsuka et al. | |
| 6,613,459 B1 | * | 9/2003 | Saito et al. | .................. 428/832.1 |
| 6,999,279 B2 | * | 2/2006 | Lundstrom | .................... 360/131 |
| 2005/0052986 A1 | * | 3/2005 | Morita et al. | ............... 369/275.2 |
| 2005/0069732 A1 | * | 3/2005 | Kamata et al. | ........... 428/694 TC |
| 2006/0023329 A1 | | 2/2006 | Tagami | |
| 2006/0065136 A1 | * | 3/2006 | Takahashi et al. | .............. 101/3.1 |
| 2006/0280861 A1 | * | 12/2006 | Shirotori et al. | ............... 427/127 |
| 2007/0003793 A1 | * | 1/2007 | Sakurai et al. | ................ 428/826 |
| 2007/0003798 A1 | * | 1/2007 | Naito et al. | ................ 428/846.2 |

(Continued)

FOREIGN PATENT DOCUMENTS

JP 05-242470 9/1993

(Continued)

OTHER PUBLICATIONS

Japanese Office Action dated May 12, 2009 for Appln. No. 2007-296865.

(Continued)

*Primary Examiner* — Gerard Higgins
*Assistant Examiner* — Sathavaram I Reddy
(74) *Attorney, Agent, or Firm* — Pillsbury Winthrop Shaw Pittman, LLP

(57) ABSTRACT

According to one embodiment, a magnetic recording medium includes a substrate, and a magnetic recording layer formed on the substrate and having patterns of protrusions and recesses corresponding to a servo area and a recording area, in which the magnetic recording layer located in each of the recesses in the recording area has a thickness smaller than two thirds of a thickness of the magnetic recording layer corresponding to each of the protrusions, the magnetic recording layer remaining in each of the recesses in the recording area has a thickness of 1 nm or more, and a difference in height on a surface of the magnetic recording medium is 7 nm or less.

8 Claims, 3 Drawing Sheets

U.S. PATENT DOCUMENTS

2007/0070547 A1* 3/2007 Kamata et al. .............. 360/135

FOREIGN PATENT DOCUMENTS

| | | |
|---|---|---|
| JP | 10-177631 | 6/1998 |
| JP | 2005-293633 | 10/2005 |
| JP | 2006-031790 | 2/2006 |
| JP | 2006-048769 | 2/2006 |
| JP | 2006-092659 | 4/2006 |
| JP | 2006-277868 | 10/2006 |
| JP | 2006-309879 | 11/2006 |

OTHER PUBLICATIONS

Chinese Office Action dated Jul. 10, 2009 for Appln. No. 2007-101887794.

Japanese Office Action dated Jun. 22, 2010 for Appln. No. 2007-296865.

* cited by examiner

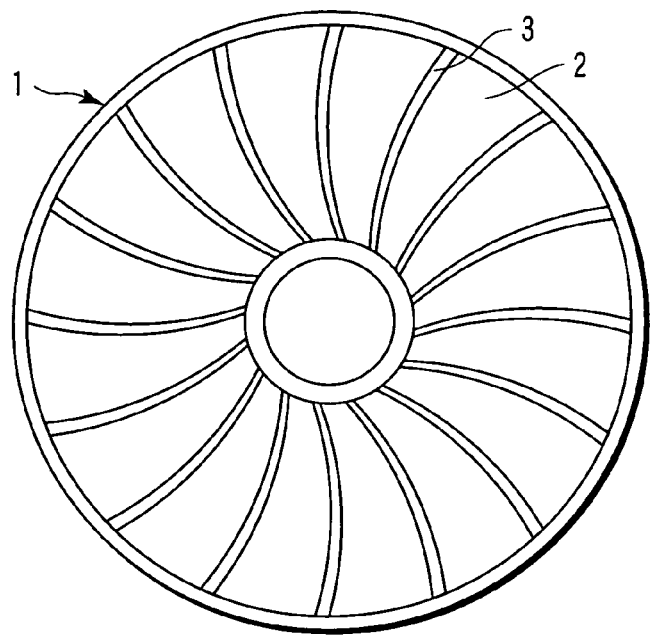
F I G. 1
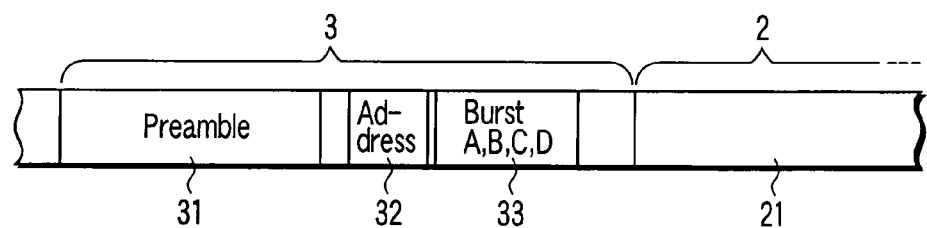
F I G. 2
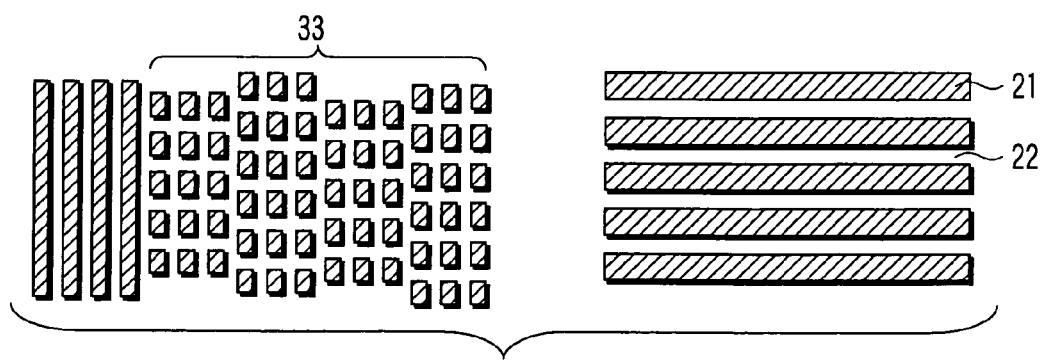
F I G. 3

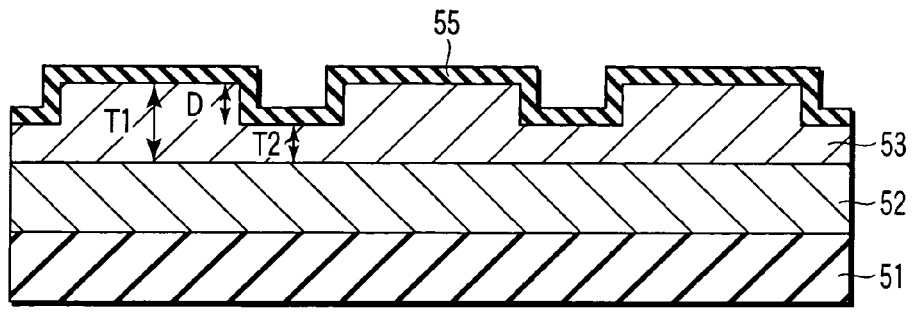
F I G. 4
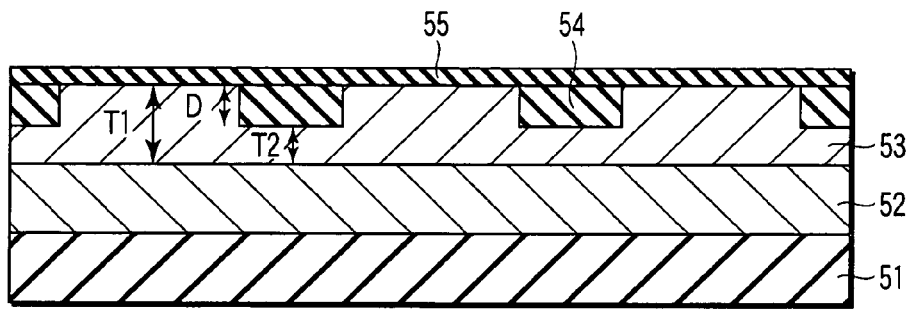
F I G. 5
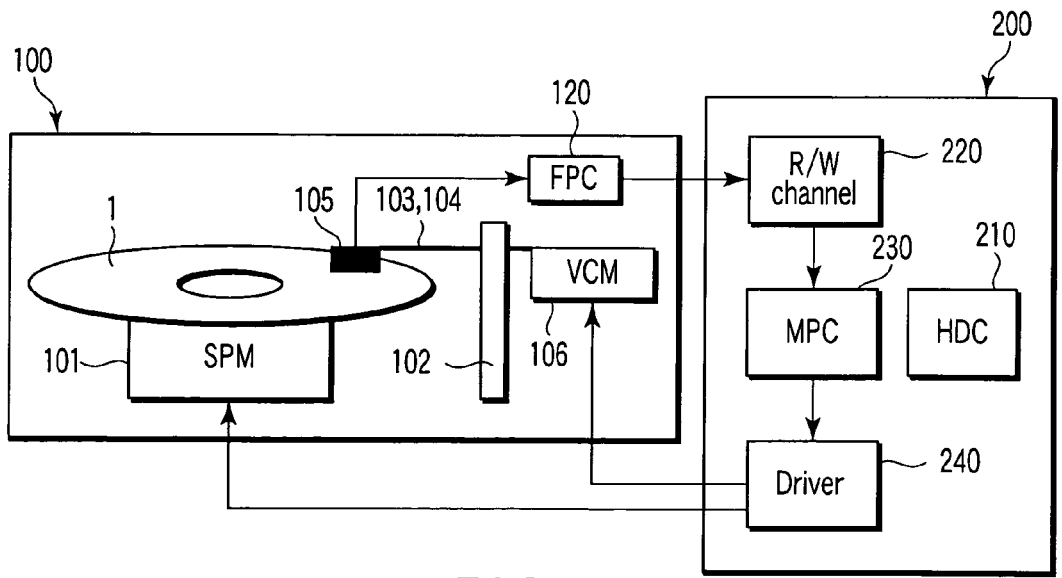
F I G. 7

MAGNETIC RECORDING MEDIUM, METHOD FOR MANUFACTURING THE SAME, AND MAGNETIC RECORDING APPARATUS

CROSS-REFERENCE TO RELATED APPLICATIONS

This application is based upon and claims the benefit of priority under 35 U.S.C. 119 from Japanese Patent Application No. 2007-296865, filed Nov. 15, 2007; and Japanese Patent Application No. 2006-314195, filed Nov. 21, 2006 the entire contents of both applications are incorporated herein by reference in their entireties.

BACKGROUND

1. Field

One embodiment of the present invention relates to a discrete track type magnetic recording medium, a method for manufacturing the same, and a magnetic recording apparatus.

2. Description of the Related Art

A recently frequent problem with magnetic recording media incorporated into hard disk drives (HDD) is that the interference between adjacent tracks prevents track density from being improved. In particular, how to reduce write bleeding resulting from a fringe effect exerted by magnetic fields from a magnetic head is an important technical problem.

To solve this problem, a proposal has been made of a discrete track magnetic recording medium (DTR medium) having a magnetic recording layer processed so as to physically separate recording tracks from one another. The DTR medium enables the inhibition of a side erase phenomenon in which information in an adjacent track is erased during write operation and a side read phenomenon in which information in an adjacent track is read during read operation, allowing an increase in track density. Therefore, the DTR medium is expected as a magnetic recording medium that can achieve a high recording density.

In conventional DTR media, a magnetic recording layer is removed from each recess between adjacent recording tracks in a recording area down to an underlayer. An embedding layer made of a nonmagnetic material is then filled into recesses so as to flatten the surface of the medium (see, for example, Jpn. Pat. Appln. KOKAI Publication No. 2006-92659). In the DTR medium, the embedding layer filled in the recesses has a bottom portion in contact with the underlayer and sidewalls in contact with the magnetic recording layer formed into protrusions. Thus, the embedding layer is in contact with the different materials, resulting in degraded adhesion. Consequently, when the magnetic recording apparatus is driven, the embedding layer is subjected to peeling, degrading the flatness of the medium surface. Further, the magnetic head is disadvantageously likely to be damaged.

On the other hand, a magnetic recording medium is known in which a part of the magnetic recording layer is selectively etched but is left in the recesses (U.S. Pat. No. 6,999,279). However, there is a great difference in height on the surface of the magnetic recording medium. This disadvantageously degrades flying properties of a magnetic head.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a schematic plan view of a magnetic recording medium according to the present invention;

FIG. 2 is a schematic diagram of a servo area and a recording area;

FIG. 3 is a plan view showing magnetic patterns in the servo area and the recording area;

FIG. 4 is a cross-sectional view of a recording area in a magnetic recording medium according to a first embodiment of the present invention;

FIG. 5 is a cross-sectional view of a recording area in a magnetic recording medium according to a second embodiment of the present invention;

FIG. 7 is a block diagram of a magnetic recording apparatus according to an embodiment of the present invention.

DETAILED DESCRIPTION

Figure 6A:
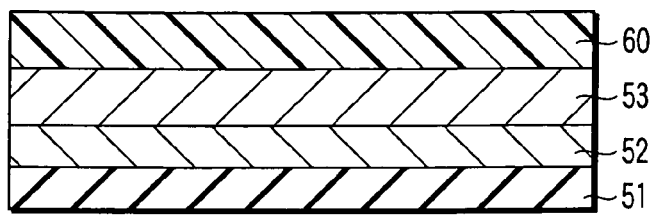
FIGS. 6A, 6B, 6C, 6D, 6E, and 6F are cross-sectional views showing a method for manufacturing a magnetic recording media according to the present invention.

Various embodiments according to the invention will be described hereinafter with reference to the accompanying drawings. In general, according to an aspect of the present invention, there is provided a magnetic recording medium comprising: a substrate; and a magnetic recording layer formed on the substrate and having patterns of protrusions and recesses corresponding to a servo area and a recording area, the magnetic recording layer located in each of the recesses in the recording area having a thickness smaller than two thirds of a thickness of the magnetic recording layer corresponding to each of the protrusions, the magnetic recording layer remaining in each of the recesses in the recording area having a thickness of 1 nm or more, and a difference in height on a surface of the magnetic recording medium being 7 nm or less.

According to another embodiment of the present invention, there is provided a magnetic recording medium comprising: a substrate; a magnetic recording layer formed on the substrate and having patterns of protrusions and recesses corresponding to a servo area and a recording area; and an embedding layer of a nonmagnetic material filled in the recesses in the recording area, the magnetic recording layer located in each of the recesses in the recording area having a thickness smaller than two thirds of a thickness of the magnetic recording layer corresponding to each of the protrusions, the magnetic recording layer remaining in each of the recesses in the recording area having a thickness of 1 nm or more, and a difference in height on a surface of the magnetic recording medium being 7 nm or less.

According to still another embodiment of the present invention, there is provided a method for manufacturing a magnetic recording medium, comprising: forming a magnetic recording layer on a substrate; and selectively etching a part of the magnetic recording layer down to a depth greater than one third of a thickness of the magnetic recording layer so as to form patterns of protrusions and recesses corresponding to a servo area and a recording area so that the magnetic recording layer remaining in each of the recesses in the recording area has a thickness of 1 nm or more and that a difference in height on a surface of the magnetic recording medium is 7 nm or less.

A magnetic recording medium according to the present invention will be described with reference to the drawings.

FIG. 1 shows a schematic plan view of a magnetic recording medium 1 according to the present invention. FIG. 1 shows a recording area 2 and a servo area 3. User data is recorded in the recording area 2. The magnetic recording medium is a DTR medium having discrete tracks formed of concentric magnetic patterns. Recording tracks will be described below with reference to FIG. 2. In the servo area 3, servo information required to position a head is formed into magnetic patterns. The servo area 3 is shaped like a circular arc corresponding to the locus of a head slider accessing the magnetic recording medium. The servo area 3 is formed to have a circumferential length increasing as a radial position in the servo area 3 approaches the outer periphery of the recording medium. FIG. 1 shows 15 servo areas 3, but not less than 100 servo areas 3 are formed in an actual medium.

With reference to FIGS. 2 and 3, description will be given of a schematic diagram of the servo area and recording area as well as the magnetic patterns.

Recording tracks 21 made of magnetic patterns constituting a plurality of protrusions are formed in the recording area 2 at a predetermined track pitch Tp. User data is recorded in the recording tracks 21. The recording tracks 21 arranged adjacent to each other along the cross-track direction are separated from each other by a recess or a guard band 22 made of a nonmagnetic material. In the embodiment of the present invention, a magnetic recording layer thinner than a magnetic recording layer corresponding to each of the protrusions in the recording track 21 remains at the bottom of the guard band 22. The ratio of the width of the recording track 21 to the width of the guard band 22 in the cross-track direction is, for example, 2:1. That is, the area ratio of the recording tracks 21 in the recording area 2 is about 67%. These rates are appropriately set.

The servo area 3 includes a preamble section 31, an address section 32, and a burst section 33. Patterns of a magnetic recording layer which provide servo signals are formed in the preamble section 31, address section 32, and burst section 33 in the servo area 3. These sections have functions described below.

The preamble section 31 allows the execution of a PLL process of synchronizing a servo signal read clock when a time difference results from rotational decentering of the medium and an AGC process of appropriately maintaining a signal read width. The preamble section 31 has magnetic patterns which constitute protrusions extending continuously in a radial direction without being separated so as to form substantial circular arcs and which are repeatedly formed in a circumferential direction. The area ratio of the magnetic patterns constituting the protrusions in the preamble section 31 is about 50%.

In the address section 32, servo signal recognition codes called servo marks, sector information, cylinder information, and the like are formed at the same pitch as the circumferential pitch in the preamble section 31 using Manchester codes. In particular, the cylinder information has patterns in which the information varies with the servo track. Thus, to reduce the adverse effect of address read errors during a seek operation, the cylinder information is converted into gray codes that minimize the difference in information between the adjacent tracks and the gray codes are then converted into Manchester codes for recording. The area ratio of the magnetic patterns constituting the protrusions in the address section 32 is also about 50%.

The burst section 33 is an off-track detecting area required to detect the off-track amount of a cylinder address with respect to an on-track state. Four types of marks (called an A burst, a B burst, a C burst, and a D burst) are formed in the burst section 33 by shifting a pattern phase in the radial direction. In each of the bursts, a plurality of marks are arranged at the same pitch as that in the preamble section in the circumferential direction. The radial period of each burst is proportional to a period at which an address pattern varies, in other words, a servo track period. About 10 periods of each burst are formed in the circumferential direction. The bursts are repeatedly formed in the radial direction at a pitch double the servo track period. The area ratio of the magnetic patterns constituting the protrusions in the burst section 33 is about 75%.

The marks in the burst section 33 are designed to be rectangular, or in a strict sense, to be parallelograms taking a skew angle during head access into account. However, the marks are slightly rounded depending on the processing accuracy of a stamper or processing performance such as transfer formation. The principle of position detection in the burst section 33 will not be described in detail. The off-track amount is calculated by arithmetically processing the average amplitude value of read signals from each of the A, B, C, and D bursts.

FIG. 4 shows a cross-sectional view of a recording area in a perpendicular magnetic recording medium according to a first embodiment of the present invention. In FIG. 4, a soft underlayer 52, a magnetic recording layer 53 constituting patterns of protrusions and recesses, and a protective layer 55 are formed on a substrate 51. A part of the magnetic recording layer 53 is selectively etched so as to form recesses. However, a thinner part of the magnetic recording layer remains at the bottom of each of the recesses. In the recording area shown in FIG. 4, the depth D of the recesses is greater than one third of the thickness $T_1$ of the magnetic recording layer corresponding to each of the protrusions. The thickness $T_2$ of the magnetic recording layer remaining in each of the recesses in the recording area should preferably be 1 nm or more. In the present embodiment, the embedding layer is not filled into the recesses, but a difference in height on the surface of the magnetic recording medium should preferably be 7 nm or less.

In the magnetic recording medium in FIG. 4, the magnetic recording layer corresponding to each of the protrusions and used as a recording track has a sufficient thickness and sufficient magnetic properties, allowing recording magnetization to be stably retained. On the other hand, the magnetic recording layer located in each of the recesses has a smaller thickness so as not to affect recording magnetization of the adjacent recording track. That is, when having a sufficiently small thickness, the magnetization of the magnetic recording layer located in each of the recesses is made more unstable than that of the recording tracks, resulting in random magnetization. To prevent the magnetic recording layer located in each of the recesses from affecting the recording magnetization in the recording tracks, it is necessary to make the depth D of the recesses greater than one third of the thickness $T_1$ of the magnetic recording layer corresponding to each of the protrusions and to make the thickness $T_2$ of the magnetic recording layer remaining at the bottom of the recesses smaller than two thirds of the thickness $T_1$ of the magnetic recording layer corresponding to each of the protrusions.

On the other hand, to ensure the flying stability of the magnetic head in the magnetic recording apparatus, the difference in height on the surface of the medium is preferably reduced. The flying stability of the magnetic head can be evaluated on the basis of a touchdown pressure at which the magnetic head comes into contact with the medium when the magnetic recording apparatus is used under a reduced pressure. The flying stability is improved if the particular pressure value is as low as possible. To ensure a touchdown pressure of 0.5 atm indicating that the flying stability is appropriate, the difference in height on the surface of the medium needs to be 7 nm or less. Meeting this condition eliminates the need to fill the embedding layer into the recesses.

In order to make the thickness $T_2$ of the magnetic recording layer remaining at the bottom of the recesses smaller than two thirds of the thickness $T_1$ of the magnetic recording layer corresponding to each of the protrusions and to make the difference in height on the surface of the medium 7 nm or less in the case where the embedding layer is not filled into the recesses, the thickness $T_1$ of the magnetic recording layer corresponding to each of the protrusions is made 10 nm or less and the thickness $T_2$ of the magnetic recording layer remaining at the bottom of the recesses is made 8 nm or more and 10 nm or less, for example.

Further, process time is preferably short when a part of the magnetic recording layer is selectively etched to form the recesses. Increasing the thickness of the magnetic recording layer left in each of the recesses reduces the required process time. The process time is effectively shorter when the thickness $T_2$ of the magnetic recording layer left at the bottom of the recesses is set to 1 nm or more, compared to when the magnetic recording layer is completely removed from the recesses.

With the magnetic recording medium according to the present invention, the recording area and the servo area are processed at a time. Consequently, the depth of the recesses is the same in the recording area and in the servo area. Servo patterns formed in the servo area are magnetized in one direction perpendicular to the medium surface. The magnetic head positioning utilizing the servo patterns is performed by reading a variation in signal intensity resulting from a variation in the thickness of the magnetic recording layer. To ensure the contrast of the servo signals, the thickness $T_2$ of the magnetic recording layer located in each of the recesses should be smaller than two thirds of the thickness $T_1$ of the magnetic recording layer corresponding to each of the protrusions.

FIG. 5 is a cross-sectional view of a recording area in a perpendicular magnetic recording medium according to a second embodiment of the present invention. In FIG. 5, the soft underlayer 52, the magnetic recording layer 53 constituting the patterns of protrusions and recesses, an embedding layer 54 filled in the recesses portions, and the protective layer 55 are formed on the substrate 51. A part of the magnetic recording layer 53 is selectively etched so as to form the recesses. However, a thinner part of the magnetic recording layer remains at the bottom of each of the recesses. Also in the recording area shown in FIG. 5, the depth D of the recesses is greater than one third of the thickness $T_1$ of the magnetic recording layer corresponding to each of the protrusions. The thickness $T_2$ of the magnetic recording layer remaining in each of the recesses in the recording area should preferably be 1 nm or more. The reason for these requirements is the same as those in the first embodiment described above.

In the second embodiment, with the embedding layer 54 formed in the recesses, the difference in height on the surface is 7 nm or less. In this case, since the surface can be easily flattened, the difference between the thickness $T_1$ of the magnetic recording layer corresponding to each of the protrusions and the thickness $T_2$ of the magnetic recording layer located in each of the recesses need not be 7 nm or less. Even if the difference between the two locations is greater than 7 nm, it suffices that the magnetic recording medium finally manufactured via a flattening process performed later has 7 nm or less of a difference in height on the surface thereof.

In the second embodiment, not only the sidewalls but also the bottom portion of the embedding layer 54 is in contact with the magnetic recording layer 53. Thus, all the parts of the embedding layer 54 are in contact with the same material, enabling uniform film formation. The adhesion of the embedding layer 54 is thus improved. This prevents the embedding layer 54 from being subjected to peeling even when the magnetic recording apparatus is driven.

Now, with reference to FIGS. 6A, 6B, 6C, 6D, 6E, and 6F, description will be given of a method for manufacturing a magnetic recording medium using an imprint method according to the present invention.

As shown in FIG. 6A, the soft underlayer 52 and the magnetic recording layer 53 are formed on the substrate 51. A resist 60 is coated on the magnetic recording layer 53.

The substrate 51 may be, for example, a glass substrate, an Al-based alloy substrate, a ceramic substrate, a carbon substrate, an Si single crystal substrate having an oxide surface, and any of these substrates which is plated with Nip or the like.

The soft underlayer 52 is composed of a material containing Fe, Ni, or Co. Specific examples of the material of the soft underlayer 52 include an FeCo-based alloy such as FeCo or FeCoV, an FeNi-based alloy such as FeNi, FeNiMo, FeNiCr, or FeNiSi, an FeAl-based alloy and an FeSi-based alloy such as FeAl, FeAlSi, FeAlSiCr, FeAlSiTiRu, or FeAlO, an FeTa-based alloy such as FeTa, FeTaC, or FeTaN, and an FeZr-based alloy such as FeZrN.

The magnetic recording layer 53 is composed of, for example, a magnetic material mainly containing Co and at least Pt and further containing an oxide, and has perpendicular magnetic anisotropy. The oxide is particularly preferably silicon oxide or titanium oxide.

Patterns of protrusions and recesses are transferred to the resist 60 by imprinting described below, and the resist 60 is then used as a mask material with which recesses and protrusions are formed in the magnetic recording layer 53. A material for the resist is such that recesses and protrusions can be transferred by imprinting after applied to the magnetic recording layer. Examples of the material for the resist include a polymer material, a low-molecular-weight organic material, and a liquid Si-based resist. The present embodiment uses spin-on-glass (SOG), which is a liquid Si-based resist.

Figure 6B:
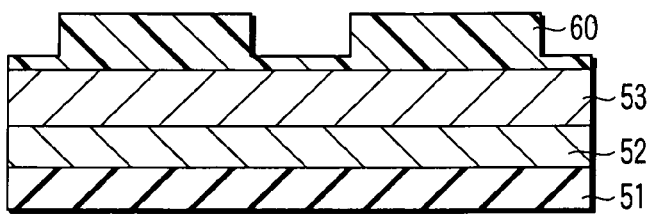

In FIG. 6B, the patterns of protrusions and recesses are transferred to the resist by imprinting. The transfer step is performed by imprint lithography using a simultaneous double-sided transfer imprint apparatus. An imprint stamper (not shown) on which desired patterns of protrusions and recesses are formed is uniformly pressed against the entire surface of the resist (SOG) formed on each of the opposite surfaces of the substrate. Recesses in the resist 60 formed by the transfer step correspond to recesses formed in the magnetic recording layer 53.

Figure 6C:
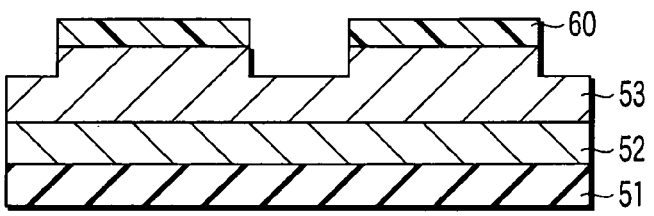

In FIG. 6C, the magnetic recording layer 53 is processed. The resist residues remaining in the recesses in the resist 60 having the patterns of protrusions and recesses obtained in FIG. 6B are removed to expose the magnetic recording layer 53. Then, ion milling is carried out using the remaining patterned resist 60 as a mask, to form recesses in the magnetic recording layer 53. To leave a thinner part of the magnetic recording layer 53 at the bottom of the recesses, for example, the time required for the ion milling is controlled.

Figure 6D:
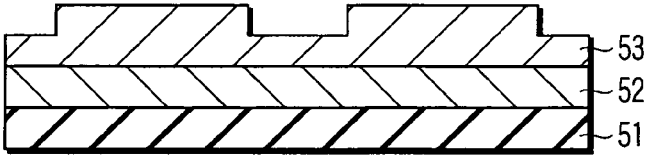

In FIG. 6D, the remaining resist is etched away. In the first embodiment, shown in FIG. 4, the protective film is then formed.

Figure 6E:
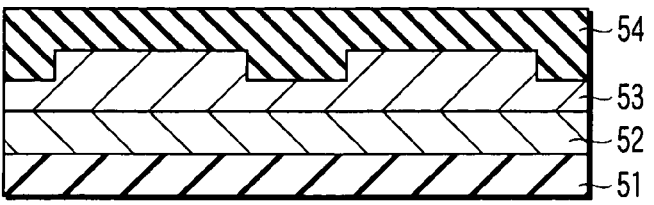

In FIG. 6E, the embedding layer 54 of a sufficient thickness is formed by sputtering. The embedding layer 54 is composed of a nonmagnetic material, for example, carbon (C), an oxide such as $SiO_2$ or $Al_2O_3$, or metal such as Ti.

Figure 6F:
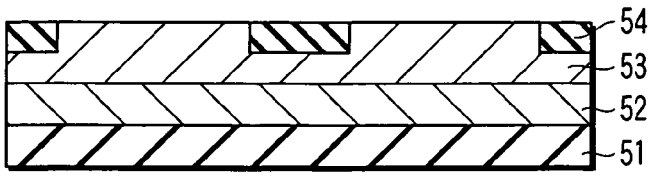

In FIG. 6F, the embedding layer 54 is etched back to the magnetic recording layer 53 to fill the embedding layer 54 into the recesses so as to flatten the surface of the magnetic recording layer 53.

The protective layer is subsequently formed on the surface of the magnetic recording layer 53. The protective layer is intended to prevent the perpendicular recording layer from being corroded and to prevent the medium surface from being damaged when the magnetic head comes into contact with the medium surface. A material for the protective layer includes, for example, carbon (C), $SiO_2$, or $ZiO_2$. A lubricant is further coated on the surface of the protective layer.

Now, description will be given of a magnetic recording apparatus in which the magnetic recording medium according to the present invention is mounted. FIG. 7 shows a block diagram of a magnetic recording apparatus according to an embodiment of the present invention. The figure shows a head slider only over a top surface of the magnetic recording medium. However, a perpendicular magnetic recording layer having discrete tracks is formed on both surfaces of the magnetic recording medium. A down head and an up head are provided over the top surface of and under the bottom surface of the magnetic recording medium, respectively. The configuration of the magnetic recording apparatus is basically similar to that of the conventional magnetic recording apparatus except that the former uses the magnetic recording medium according to the present invention.

A disk drive includes a main body portion called a head disk assembly (HDA) 100 and a printed circuit board (PCB) 200.

The head disk assembly (HDA) 100 has a magnetic recording medium (DTR medium) 1, a spindle motor 101 that rotates the magnetic recording medium 1, an actuator arm 103 that moves around a pivot 102, a suspension 104 attached to a tip of the actuator arm 103, a head slider 105 supported by the suspension 104 and including a read head and a write head, a voice coil motor (VCM) 106 that drives the actuator arm 103, and a head amplifier (not shown) that amplifies input signals to and output signals from the head. The head amplifier (HIC) is provided on the actuator arm 103 and connected to the printed circuit board (PCB) 200 via a flexible cable (FPC) 120. Providing the head amplifier (HIC) on the actuator arm 103 as described above enables an effective reduction in noise in head signals. However, the head amplifier (HIC) may be fixed to the HDA main body.

The perpendicular magnetic recording layer is formed on both surfaces of the magnetic recording medium 1 as described above. On each of the opposite perpendicular magnetic recording layers, the servo areas are formed like circular arcs so as to coincide with the locus along which the head moves. Specifications for the magnetic recording medium satisfy an outer diameter, an inner diameter, and read/write properties which are adapted for the drive. The radius of the circular arc formed by the servo area is given as the distance from the pivot to the magnetic head element.

Four main system LSIs are mounted on the printed circuit board (PCB) 200. The four main system LSIs include a disk controller (HDC) 210, a read/write channel IC 220, MPU 230, and a motor driver IC 240.

MPU 230 is a control section for a driving system and includes ROM, RAM, CPU, and a logic processing section which are required to implement a head positioning control system according to the present embodiment. The logic processing section is an arithmetic processing section composed of a hardware circuit to execute high-speed arithmetic processes. The firmware (FW) for the logic processing section is stored in ROM. MPU controls the drive in accordance with FW.

The disk controller (HDC) 210 is an interface section in the hard disk and exchanges information with an interface between the disk drive and a host system (for example, a personal computer), MPU, the read/write channel IC, and the motor driver IC to control the entire drive.

The read/write channel IC 220 is a head signal processing section composed of a circuit which switches a channel to the head amplifier (HIC) and which processes read/write signals.

The motor driver IC 240 is a driver section for the voice coil motor (VCM) 77 and the spindle motor 72. The motor driver IC 240 controls the spindle motor 72 to a given rotation speed and provides a VCM manipulation variable from MPU 230 to VCM 77 as a current value to drive a head moving mechanism.

EXAMPLES

Samples 1-1, 1-2, 1-3 and 1-4

A troidal glass substrate having an outer diameter of 48 mm and a center hole of inner diameter 12 mm was used as a substrate. FeCoV was deposited on the substrate to form a soft underlayer of thickness 100 nm. CoCrPt was then deposited on the soft underlayer to form a magnetic recording layer of thickness 15 nm. Spin-on-glass (SOG) was then spin-coated on the magnetic recording layer to a thickness of about 70 nm as a resist.

An Ni stamper of thickness 0.4 mm was prepared as an imprint stamper. Such patterns as shown in FIG. 3 had been formed on the Ni stamper. The track pitch was 100 nm. The recesses of the patterns on the Ni stamper had a depth of 50 nm.

The imprint stamper was pressed against the substrate on which the resist had been coated, at a pressure of 200 MPa for 1 minute in atmosphere at the normal temperature. The recesses and protrusions on the imprint stamper were transferred to the resist surface. The depth of the recesses in the resist was equal to that of the recesses in the imprint stamper, i.e., 50 nm.

The resist patterns obtained were etched using a $CF_4$ gas to remove resist residues at the bottom of the recesses to expose the magnetic recording layer. Then, Ar ion-milling was carried out using the remaining resist patterns as a mask, to etch the magnetic recording layer so that the magnetic recording layer was left at the bottom of the recesses. The remaining resist patterns were etched away using a $CF_4$ gas. A protective layer of diamond like carbon (DLC) was further formed. A lubricant was applied to the protective layer to manufacture a magnetic recording medium.

In such a manner, four samples, i.e., 1-1, 1-2, 1-3 and 1-4, are manufactured. The magnetic recording layer remaining in each of the recesses after etching had a thickness of 11 nm (Sample 1-1), 10 nm (Sample 1-2), 8 nm (Sample 1-3), or 7 nm (Sample 1-4).

Sample 2

The thickness of the magnetic recording layer formed on the substrate was set to 10 nm, and the magnetic recording layer was etched by 3.3 nm in the ion milling step so that a magnetic recording layer having a thickness of 6.6 nm was left at the bottom of the recesses. A magnetic recording medium (Sample 2) was manufactured in the same manner as those in the series of Samples 1 except for the above steps.

Sample 3

A magnetic recording layer with a thickness of 15 nm was formed on a substrate, and the magnetic recording layer was etched by 12 nm in the ion milling step so that a magnetic recording layer having a thickness of 3 nm was left at the bottom of the recesses. Carbon was deposited by sputtering to form an embedding layer with a thickness of 50 nm. The embedding layer was then etched back to the surface of the magnetic recording layer. The recesses in the magnetic recording layer were thus filled with the embedding layer so as to flatten the surface of the magnetic recording layer. A magnetic recording medium (Sample 3) was manufactured in the same manner as those in the series of Samples 1 except for the above steps. The difference in height on the surface of the medium was 7 nm.

Sample 4

A magnetic recording layer with a thickness of 15 nm was formed on a substrate, and the magnetic recording layer was etched by 10 nm in the ion milling step so that a magnetic recording layer having a thickness of 5 nm was left at the bottom of the recesses, but recesses in the magnetic recording layer were not filled with an embedding layer. A magnetic recording medium (Sample 4) was manufactured in the same manner as that in Sample 3 except for the above steps. The difference in height on the surface of the medium was 10 nm.

Sample 5

A magnetic recording layer with a thickness of 15 nm was formed on a substrate, and the magnetic recording layer was etched over the entire thickness of 15 nm to expose the underlayer, and an embedding layer was filled in the recesses. A magnetic recording medium (Sample 5) was manufactured in the same manner as that in Sample 3 except for the above steps. The difference in height on the surface of the medium was 7 nm.

Hard disk drives were produced in which the respective media of Samples 1-1, 1-2, 1-3, 1-4, 2, 3, 4 and 5, and a read/write head were mounted. The read/write head had a magnetic write width of 100 nm, a magnetic read width of 80 nm, and a flying height of 11 nm for the perpendicular magnetic recording medium in which a magnetic recording layer was not subjected to a patterning process. For the above drives, touchdown tests under a reduced pressure, random seek tests of the head under atmospheric pressure over 10 hours, and servo tracking tests were carried out.

If a drive has a touchdown pressure of 0.5 atm or less, it is accepted in the touchdown test. If a drive exhibits no film peeling after seek operation when the surface of the medium is observed with a microscope, it is accepted in the seek test. If a drive has positioning accuracy of 0.6 nm or less, it is accepted in the servo tracking test. These results are shown in Table 1.

The drive in which the medium of Sample 4 was mounted did not pose any problem in the head seek test but had a touchdown pressure of 0.7 atm. The drive in which the medium of Sample 5 was mounted had a touchdown pressure of 0.4 atm. However, the drive brought about head damage in the head seek test. Further, in this drive, fractions of the embedding layer peeled from the medium were found on the surface of the head.

The drive in which the medium of Sample 1-1 was mounted, having a magnetic recording layer with a thickness of 11 nm in recesses, showed low servo signal intensity, which made it impossible for the read/write head to perform tracking. It is assumed that this is due to small difference in signal intensity between the protrusions and the recesses. In contrast, it was confirmed that, in the drives in which the medium of Sample 1-2, 1-3 or 1-4 was mounted, having a magnetic recording layer with a thickness of 10 nm or less in recesses, the read/write head performed good tracking. It is found from these results that the magnetic recording layer left in the recesses should have a thickness smaller than two thirds of a thickness of the magnetic recording layer at the protrusions.

The drive in which the medium of Sample 1-4 was mounted, having 8 nm of a difference in height on the surface thereof, had a touchdown pressure of 0.65 atm and did not pass the touchdown test. In contrast, the drives in which the medium of Sample 1-1, 1-2 or 1-3 was mounted, having 7 nm or less of a difference in height on the surface thereof, passed the touchdown test. It is found from these results that the difference in height on the surface of the medium should be 7 nm or less.

The drives in which the medium of Sample 2 or 3 was mounted, did not pose any problem in the touchdown test, the head seek test, and the servo tracking test.

TABLE 1

| Sample | Thickness of magnetic layer at protrusions | Thickness of magnetic layer in recesses | Difference in height on surface | Touchdown pressure (atm) | Peeling test | Servo tracking test |
| --- | --- | --- | --- | --- | --- | --- |
| 1-1 | 15 nm | 11 nm | 4 nm | 0.3 | OK | NG |
| 1-2 | 15 nm | 10 nm | 5 nm | 0.4 | OK | OK |
| 1-3 | 15 nm | 8 nm | 7 nm | 0.5 | OK | OK |
| 1-4 | 15 nm | 7 nm | 8 nm | 0.65 NG | OK | OK |
| 2 | 10 nm | 6.6 nm | 3.3 nm | 0.3 | OK | OK |
| 3 | 15 nm | 3 nm | 7 nm | 0.5 | OK | OK |
| 4 | 15 nm | 5 nm | 10 nm | 0.7 NG | OK | OK |
| 5 | 15 nm | 0 nm | 7 nm | 0.5 | NG | OK |

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium comprising:
    a substrate; and
    a magnetic recording layer formed on the substrate and having patterns of protrusions and recesses corresponding to a servo area and a recording area,
    the magnetic recording layer located in each of the recesses in the recording area having a thickness smaller than two thirds of a thickness of the magnetic recording layer corresponding to each of the protrusions, the magnetic recording layer remaining in each of the recesses in the recording area having a thickness of 1 nm or more, and a difference in height on a surface of the magnetic recording medium being 7 nm or less.

2. The medium according to claim 1, wherein the magnetic recording layer corresponding to each of the protrusions has a thickness of 15 nm or less, and the magnetic recording layer remaining in each of the recesses in the recording area has a thickness of 10 nm or less.

3. The medium according to claim 1, wherein the magnetic recording layer corresponding to each of the protrusions has a thickness of 10 nm or less, and the magnetic recording layer remaining in each of the recesses in the recording area has a thickness of 6.6 nm or less.

4. A method for manufacturing a magnetic recording medium, comprising:
    forming a magnetic recording layer on a substrate; and
    selectively etching a part of the magnetic recording layer down to a depth greater than one third of a thickness of the magnetic recording layer so as to form patterns of protrusions and recesses corresponding to a servo area and a recording area so that the magnetic recording layer remaining in each of the recesses in the recording area has a thickness of 1 nm or more and that a difference in height on a surface of the magnetic recording medium is 7 nm or less.

5. The method according to claim 4, wherein the magnetic recording layer has a thickness of 15 nm or less, and the magnetic recording layer remaining in each of the recesses in the recording area has a thickness of 10 nm or less.

6. The method according to claim 4, wherein the magnetic recording layer has a thickness of 10 nm or less, and the magnetic recording layer remaining in each of the recesses in the recording area has a thickness of 6.6 nm or less.

7. The method according to claim 4, further comprising, forming an embedding layer of a nonmagnetic material in the recesses in the recording area by DC sputtering so as to set the difference in height on the surface of the magnetic recording medium to 7 nm or less.

8. A magnetic recording apparatus comprising:
    the magnetic recording medium according to claim 1; and
    a magnetic head.

* * * * *